United States Patent
Tüsel

(10) Patent No.: US 7,498,934 B2
(45) Date of Patent: Mar. 3, 2009

(54) POWER SUPPLY AND USEFUL DATA EXCHANGE BETWEEN A FIRE ALARM CONTROL UNIT AND A CURRENT SINK

(75) Inventor: Andreas Tüsel, Binz (CH)

(73) Assignee: Siemens Schweiz AG, Zurich (CH)

( * ) Notice: Subject to any disclaimer, the term of this patent is extended or adjusted under 35 U.S.C. 154(b) by 339 days.

(21) Appl. No.: 11/582,402

(22) Filed: Oct. 18, 2006

(65) Prior Publication Data
US 2007/0085665 A1  Apr. 19, 2007

(30) Foreign Application Priority Data
Oct. 18, 2005  (EP)  ................... 05109695

(51) Int. Cl.
*G08B 29/00*  (2006.01)
*H04M 11/04*  (2006.01)
(52) U.S. Cl. ............ 340/506; 340/509; 340/512; 340/530; 340/538; 340/538.11; 340/288
(58) Field of Classification Search ......... 340/506, 340/509, 530, 538, 538.11, 288
See application file for complete search history.

(56) References Cited

U.S. PATENT DOCUMENTS

| | | | |
|---|---|---|---|
| 4,926,158 A | 5/1990 | Zeigler | |
| 5,148,144 A | 9/1992 | Sutterlin et al. | |
| 5,928,344 A | 7/1999 | Stierli | |
| 6,097,761 A * | 8/2000 | Buhring et al. | ............. 375/257 |
| 2002/0053970 A1 * | 5/2002 | Plummer | ............... 340/310.01 |

FOREIGN PATENT DOCUMENTS

DE    44 25 250    1/1996

\* cited by examiner

*Primary Examiner*—Donnie L Crosland
(74) *Attorney, Agent, or Firm*—Staas & Halsey LLP

(57) ABSTRACT

A method, system and circuit arrangement exchange data and supply power to at least one current sink connected via at least one data line pair to a fire alarm control unit. A pulsed voltage is used as the supply voltage for the current sink connected via at least one data line pair. Useful data is transmitted to the fire alarm control unit between two voltage pulses. The voltage required to transmit the useful data to the fire alarm control unit is used by a capacitor of a circuit arrangement in the current sink charged beforehand by the supply voltage.

15 Claims, 3 Drawing Sheets

POWER SUPPLY AND USEFUL DATA EXCHANGE BETWEEN A FIRE ALARM CONTROL UNIT AND A CURRENT SINK

CROSS REFERENCE TO RELATED APPLICATIONS

This application is based on and hereby claims priority to European Application No. 05109695 filed on Oct. 18, 2005, the contents of which are hereby incorporated by reference.

BACKGROUND OF THE INVENTION

The invention relates to a method, a circuit arrangement and a system for exchanging data and for supplying power to at least one current sink connected via at least one data line pair to a fire alarm control unit.

Hazard alarm systems, such as alarm systems for fire, gas, temperature, etc., generally comprise detectors, which are connected to a control unit. Such hazard alarm systems are used in public buildings, office buildings, hotels, industrial premises, airports, rail stations, workshops, etc. If an alarm is triggered at one of the detectors, the control unit is notified. The functions of the control unit can be parameterized freely and support an alarm organization system tailored to the object to be monitored. Such control units generally have an integrated operating element with a graphic display unit and interfaces with communication networks. With these control units or fire alarm control units, fire alarms, display elements, etc. are connected via a data line pair, what is known as the alarm bus, to the fire alarm control unit. Spur and loop lines are used for this purpose. The power supply to current sinks, such as graphic operating elements on the individual floors of a building, surveillance cameras, graphic display units, control relays for example for opening and closing doors, windows, etc., having a power consumption greater than 20 mA, is provided via separate power lines. For data transmission purposes the current sinks must also be connected via data lines to the fire alarm control unit.

SUMMARY OF THE INVENTION

One possible object of the invention is to propose the simplest and most efficient way possible for supplying power to a current sink and for exchanging data with a fire alarm control unit via a data line pair.

The inventor proposes that a pulsed voltage is used as the supply voltage for the current sink connected via the at least one data line pair, for the exchange of data and the supply of power to at least one current sink connected via at least one data line pair to a fire alarm control unit, said sink having a power consumption greater than 20 mA. Either a clocked direct voltage or an alternating voltage is used for such a pulsed voltage. Useful data is transmitted to the fire alarm control unit between two voltage pulses. Data can be useful data and signaling data. The voltage required to transmit data to the fire alarm control unit is supplied by a capacitor of a circuit arrangement in the current sink, said capacitor having been charged beforehand by the supply voltage. The circuit arrangement comprises at least a first DC/DC converter, a capacitor and a second DC/DC converter, connected one after the other in series. The first DC/DC converter also regulates the power consumed by the alarm bus. The first DC/DC converter limits the maximum permitted voltage at the capacitor during the charging process and at the same time limits the maximum power consumed at the two-wire line, with the second DC/DC converter being used to draw the energy of the capacitor with maximum efficiency, i.e. maximizing the energy drawing period. The capacitor thus serves as a power source for the transmission of useful data to the fire alarm control unit between two voltage pulses, if no energy can be drawn on the two-wire line. The capacitor used is ideally what is known as a gold-cap capacitor integrated into the circuit arrangement. Naturally any current-storing element, having a short charge and discharge time, could be used.

One major advantage is that current sinks having a high level of power consumption are connected via the alarm bus to the fire alarm control unit for the purposes of supplying power and exchanging data. Expensive separate cables are therefore not required.

A further advantage is that the infrastructure already present in a building can be used to connect such current sinks and the current sinks behave in the manner of fire alarms, display elements, etc.

Loop wiring also has the advantage of a redundant manner of behavior in the event of a short circuit or break on the two-wire line—both for useful data and for power supply purposes.

BRIEF DESCRIPTION OF THE DRAWINGS

These and other objects and advantages will become more apparent and more readily appreciated from the following description of the preferred embodiments, taken in conjunction with the accompanying drawings of which.

DETAILED DESCRIPTION OF THE PREFERRED EMBODIMENT

Figure 1:
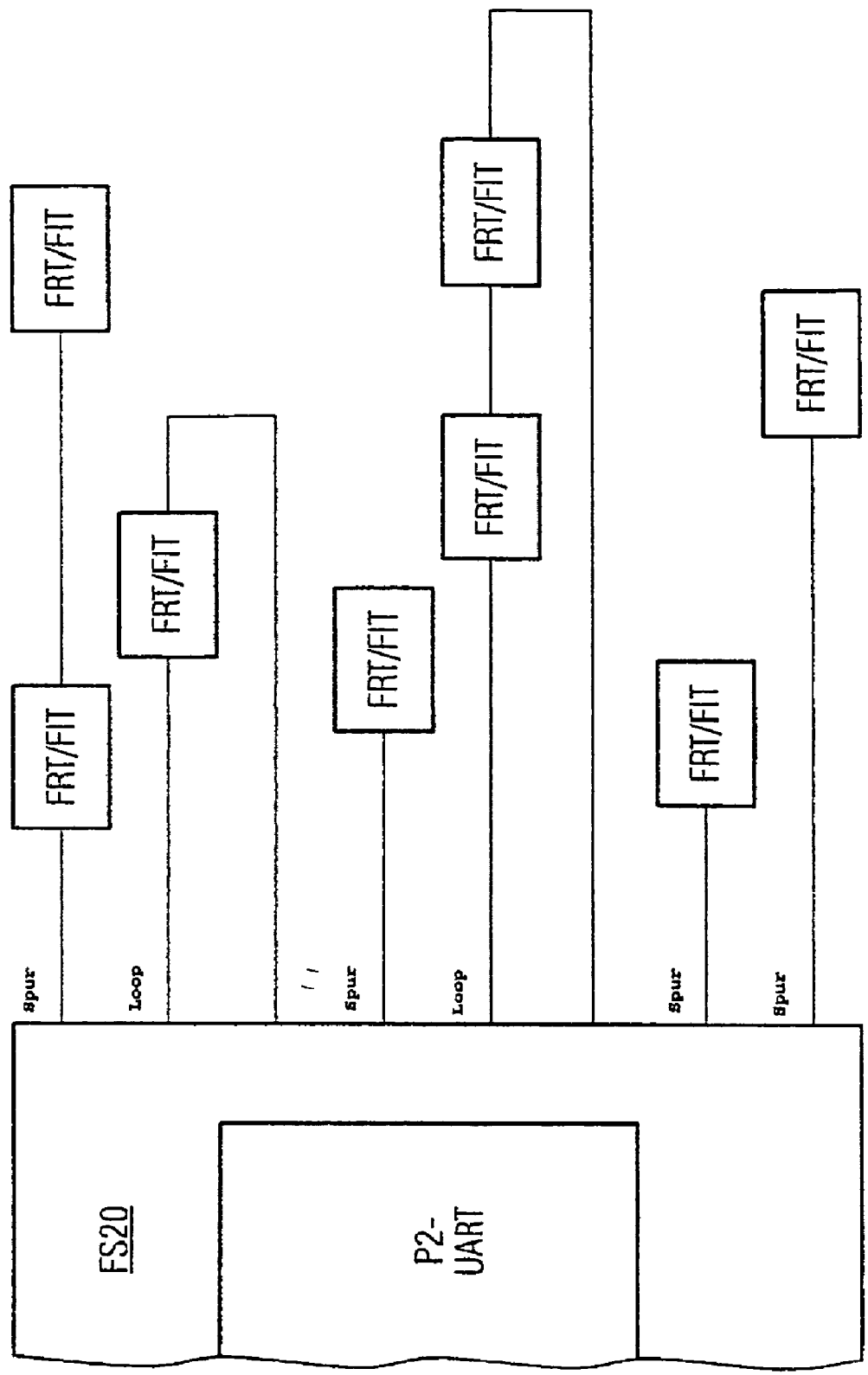
FIG. 1 shows a fire alarm control unit with current sinks connected via data lines, according to one potential embodiment of the invention.

Reference will now be made in detail to the preferred embodiments, examples of which are illustrated in the accompanying drawings, wherein like reference numerals refer to like elements throughout.

FIG. 1 shows a fire alarm control unit FS20 with current sinks FRT/FIT connected via data lines. Both spur and loop lines can be used. A current sink FRT/FIT is operated via the alarm bus, the data line, so it must also behave in the manner of a fire alarm. This means that the behavior during the initialization phase, e.g. for the alarm bus address assignment and redundancy behavior in the case of error, must be identical to fire alarms.

Figure 2:
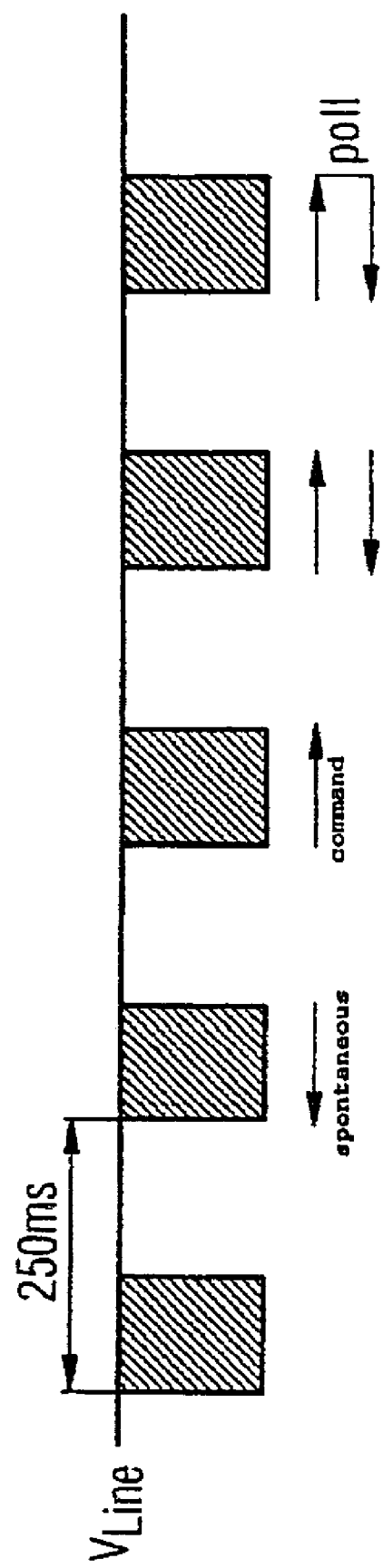
FIG. 2 shows a graphic example of a pulsed voltage.

FIG. 2 shows a graphic example of a pulsed voltage. Alarm bus communication is triggered every 250 ms in this example. A communication frame is then around 125 ms long. Around 60% of the duration of the operating cycle then remains to supply the connected current sinks on the alarm bus in this example. During communication no energy can be drawn from the alarm bus, as the current sinks communicate by a current response. The start of the communication phase is thus initiated by a drop in the voltage to approx. 6V. The pulsed voltage can be either a clocked direct voltage or an alternating voltage.

Figure 3:
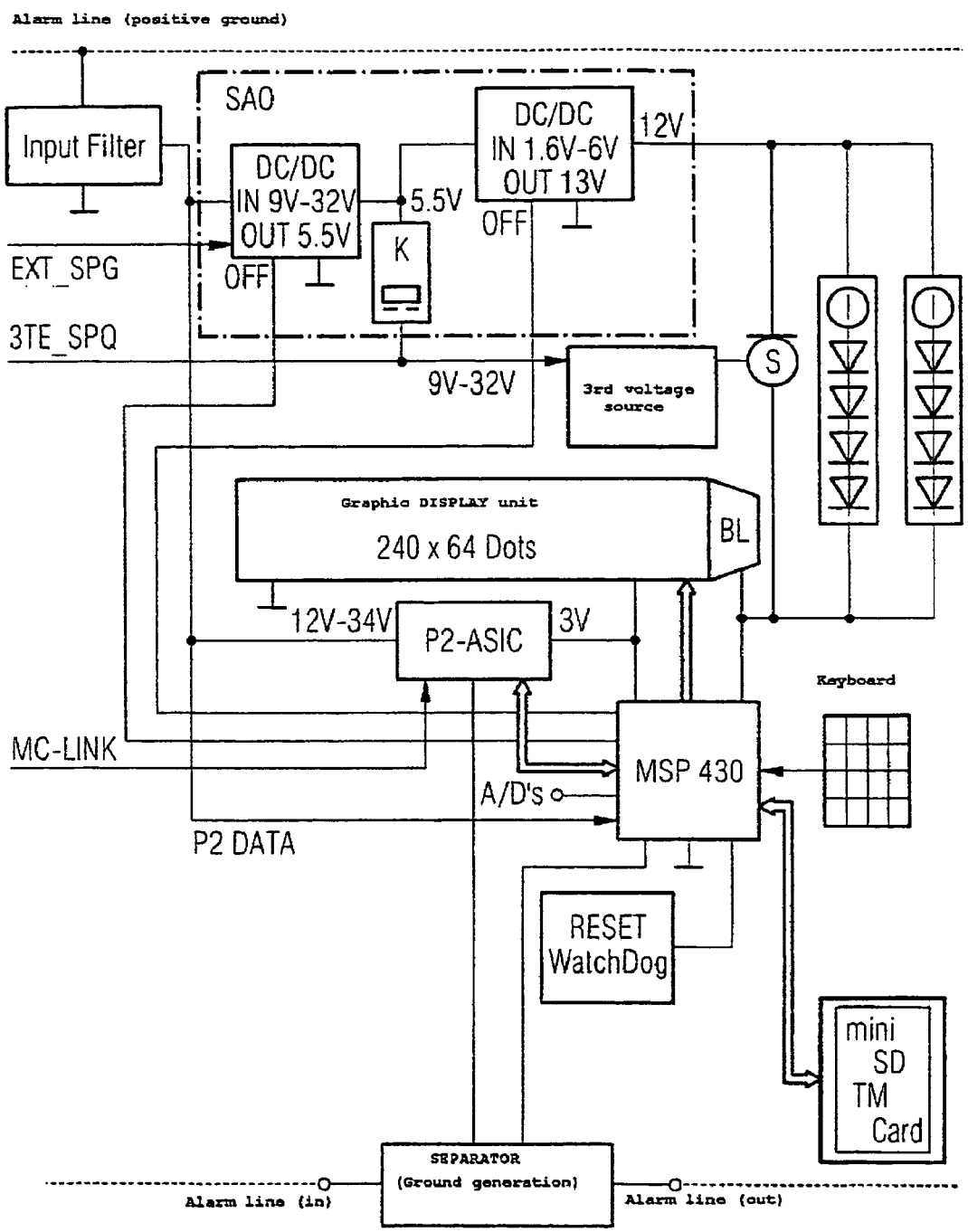
FIG. 3 shows a simplified circuit arrangement.

FIG. 3 shows a simplified circuit arrangement SAO integrated in a current sink. A current sink FRT/FIT is operated via the alarm bus, so it must also behave in the manner of a fire alarm. This means that a processor MSP must be used. The fire alarm operating system, which launches the terminal application, must be operated on this processor MSP. A current sink FRT/FIT must be able to store a large number of text messages and therefore requires a large memory. As the processor MSP has maximum storage capacity of 60 K FLASH or 10 K RAM, a memory slot is provided, for a MiniSDCard for example, so the memory can be extended in a simple manner. The circuit arrangement SAO comprises at least a first DC/DC converter DC/DC, a capacitor K and a second DC/DC converter DC/DC, which are connected one after the other in series. It ensures that the necessary voltage is supplied to transmit data between two voltage pulses to the fire alarm control unit FS20.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for exchanging data with and supplying power to a current sink connected via a data line pair to a fire alarm control unit, comprising:
   supplying power to the current sink via a pulsed voltage supplied over the data line pair;
   transmitting useful data to the fire alarm control unit between voltage pulses, the useful data being transmitted over the data line pair;
   obtaining a supply voltage from a capacitor in a circuit arrangement in the current sink to transmit the useful data to the fire alarm control unit; and
   charging the capacitor in the circuit arrangement before transmitting the useful data, the capacitor being charged with the pulsed voltage.

2. The method as claimed in claim 1, wherein the circuit arrangement contains the capacitor and at least a first DC/DC converter and a second DC/DC converter.

3. The method as claimed in claim 2, wherein
   the data line pair is connected to an alarm bus, and
   the first DC/DC converter is used to regulate a maximum permitted voltage for the capacitor and to limit a voltage drawn from the alarm bus to a maximum permitted voltage.

4. The method as claimed in claim 2, wherein the second DC/DC converter is used to maximize energy output time of the capacitor.

5. The method as claimed in claim 2, wherein a gold cap capacitor is used as the capacitor.

6. The method as claimed in claim 1, wherein the current sink comprises at least one of a graphic operating element, a surveillance camera, a graphic display unit and a control relay.

7. The method as claimed in claim 6, wherein the current sink has a current requirement greater than 20 mA.

8. The method as claimed in claim 1, wherein the pulsed voltage is either a clocked direct voltage or an alternating voltage.

9. The method as claimed in claim 1, wherein
   there are a plurality of current sinks connected to the fire alarm control unit, and
   each current sink is connected to the fire alarm control unit via a respective data line pair.

10. The method as claimed in claim 4, wherein a gold cap capacitor is used as the capacitor.

11. The method as claimed in claim 10, wherein the current sink comprises at least one of a graphic operating element, a surveillance camera, a graphic display unit and a control relay.

12. The method as claimed in claim 11, wherein the current sink has a current requirement greater than 20 mA.

13. The method as claimed in claim 12, wherein the pulsed voltage is either a clocked direct voltage or an alternating voltage.

14. A system for exchanging data and supplying power, comprising:
   a current sink;
   a data line pair connected to the current sink;
   a fire alarm control unit connected to the current sink via the data line pair to supply a pulsed voltage to the current sink;
   a transmitter provided in the current sink to transmit useful data to the fire alarm control unit between voltage pulses; and
   a circuit arrangement in the current sink to provide a supply voltage to the transmitter to transmit the useful data between the voltage pulses.

15. A circuit arrangement to provide a voltage source for transmission of useful data from a current sink to a fire alarm control unit, the current sink and the fire alarm control unit being connected via a data line pair, comprising:
   a capacitor charged by a pulsed voltage supplied over the data line pair, the capacitor providing the voltage source for transmission of useful data;
   a first DC/DC converter to regulate a maximum permitted voltage for the capacitor and to control power consumption from the data line pair; and
   a second DC/DC converter to maximize a discharge time of the capacitor.

* * * * *